United States Patent
Javadekar et al.

(10) Patent No.: US 10,621,148 B1
(45) Date of Patent: Apr. 14, 2020

(54) MAINTAINING MULTIPLE OBJECT STORES IN A DISTRIBUTED FILE SYSTEM

(71) Applicant: EMC IP Holding Company LLC, Hopkinton, MA (US)

(72) Inventors: Shrinand Javadekar, Sunnyvale, CA (US); Vijay Panghal, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 348 days.

(21) Appl. No.: 14/755,678

(22) Filed: Jun. 30, 2015

(51) Int. Cl.
*G06F 16/00* (2019.01)
*G06F 16/182* (2019.01)
*G06F 16/11* (2019.01)

(52) U.S. Cl.
CPC .......... *G06F 16/183* (2019.01); *G06F 16/11* (2019.01)

(58) Field of Classification Search
CPC .............. G06F 17/30203; G06F 17/3007
See application file for complete search history.

(56) References Cited

U.S. PATENT DOCUMENTS

| | | | | |
|---|---|---|---|---|
| 6,035,376 A | * | 3/2000 | James | G06F 12/0817 711/103 |
| 6,907,414 B1 | * | 6/2005 | Parnell | G06F 16/40 706/47 |
| 2005/0108298 A1 | * | 5/2005 | Iyengar | G06F 17/30215 |
| 2010/0257140 A1 | * | 10/2010 | Davis | G06F 17/30073 707/661 |
| 2011/0060759 A1 | * | 3/2011 | Fienblit | G06F 17/30575 707/770 |
| 2012/0331088 A1 | * | 12/2012 | O'Hare | G06F 21/6227 709/214 |
| 2013/0339604 A1 | * | 12/2013 | Zuluaga | G06F 3/0605 711/118 |
| 2014/0136782 A1 | * | 5/2014 | Thomas | G06F 17/30115 711/117 |
| 2014/0280906 A1 | * | 9/2014 | Johns | H04L 45/28 709/224 |
| 2014/0337562 A1 | * | 11/2014 | Long | G06F 3/0659 711/103 |
| 2017/0293633 A1 | * | 10/2017 | Thereska | G06F 17/30203 |

* cited by examiner

*Primary Examiner* — Taelor Kim
*Assistant Examiner* — Lahcen Ennaji
(74) *Attorney, Agent, or Firm* — Workman Nydegger

(57) ABSTRACT

A metadata server determines ("MDS") a state associated with each of a plurality of object stores, wherein each object store is at an object store location. The state associated with each of the plurality of object stores is stored on the MDS. The MDS processes a client request for the object store location associated with one of the plurality of object stores in accordance with the state.

20 Claims, 6 Drawing Sheets

MAINTAINING MULTIPLE OBJECT STORES IN A DISTRIBUTED FILE SYSTEM

FIELD OF THE INVENTION

This invention relates generally to distributed file systems, and more particularly to systems and methods for providing distributed file systems in multi-cloud environments.

BACKGROUND OF THE INVENTION

Distributed file systems manage files and folders spread across multiple computers. They may serve a similar function as traditional file systems, but are designed to provide file/folder storage and controlled access over local and wide area networks.

Cloud providers may offer scalable object stores for storing data. Individuals and business may be presented with multiple cloud provider options for storing their data.

There is a need, therefore, for an improved method, article of manufacture, and apparatus for providing a distributed file system in a multi-cloud environment.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
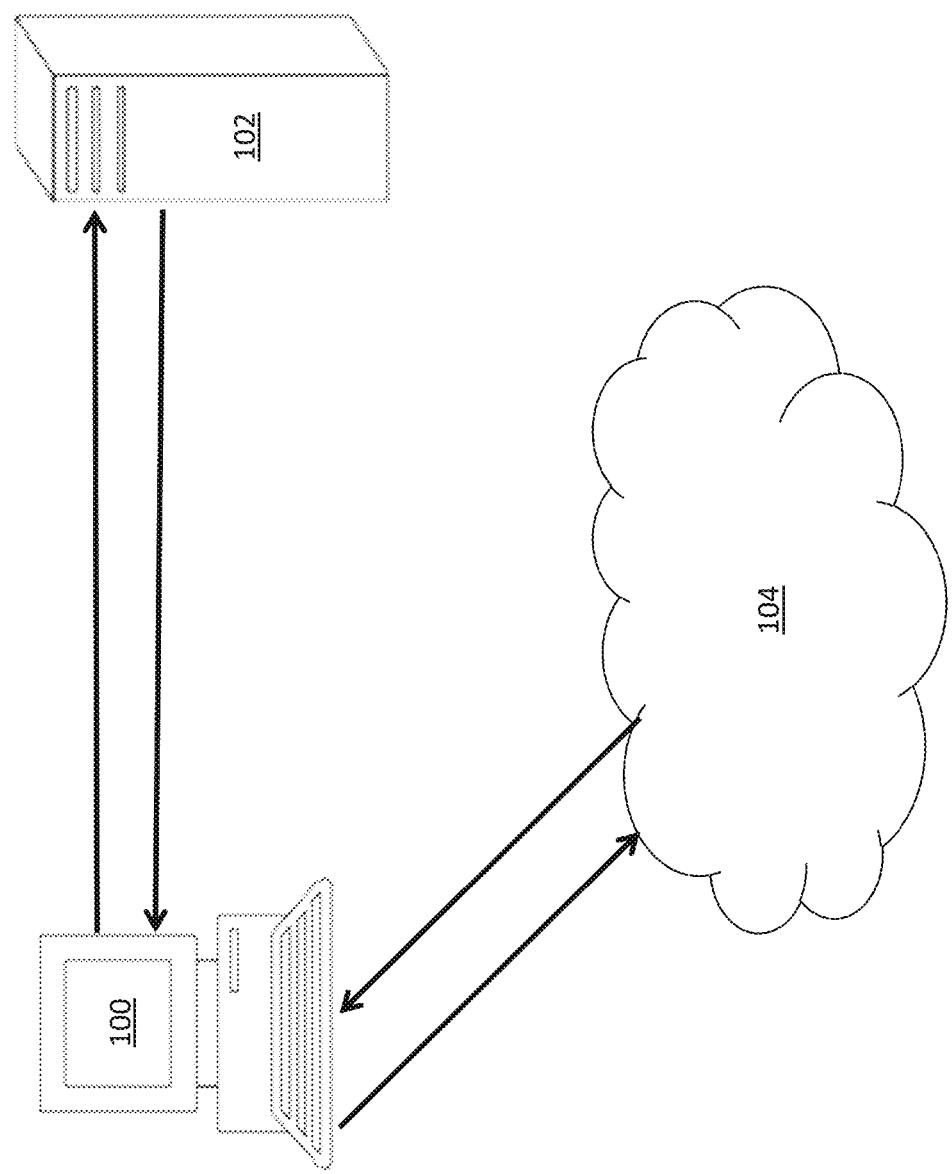
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure address a distributed file system operating on a multi-cloud environment. Distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as Amazon's AWS S3, Microsoft Azure, Google Cloud Storage, a private object store, and/or a hybrid object store. Access to the data on these object stores may be managed by a metadata server, which could be a local or remote server from the client.

Given the availability of multiple public, private, and hybrid object stores, different clients may have preferred object stores for storing the data on the distributed file system. For example, a client may have a lower latency, higher bandwidth connection to one object store versus another object store. That client may prefer to read and write data from the object store with the better connection to optimize performance. These different object store may be categorized as authoritative, secondary, and transient. Authoritative object stores may always be available and accessible by the system, while secondary and transient object stores may or may not be available. Monitoring the states of these object stores enables the system to handle client requests appropriately. The systems, methods, and processes discussed herein enable a metadata server to monitor the states of different object stores and process client requests in accordance with those states.

FIG. 1 depicts a system implementing a distributed file system in a cloud environment. The system of FIG. 1 may include client 100, metadata server ("MDS") 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be a Microsoft Azure install operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other time of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system, and <object identifier> identifies the object to be read. In an embodiment, the object identifier is a hash of the object and/or a hash of a version of the object.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST or PUT. The POST request may include the data object client 100 wishes to store on object store 104. Client 100 may wait for a confirmation from object store 104 before determining the write was successful.

While the above examples discuss reading and writing data objects as individuals, other configurations may exist. For example, individual data objects may be broken into a set of data chunks. Each of these data chunks may be stored and accessed on the object store in the same manner as the individual data objects discussed above. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

Figure 2:
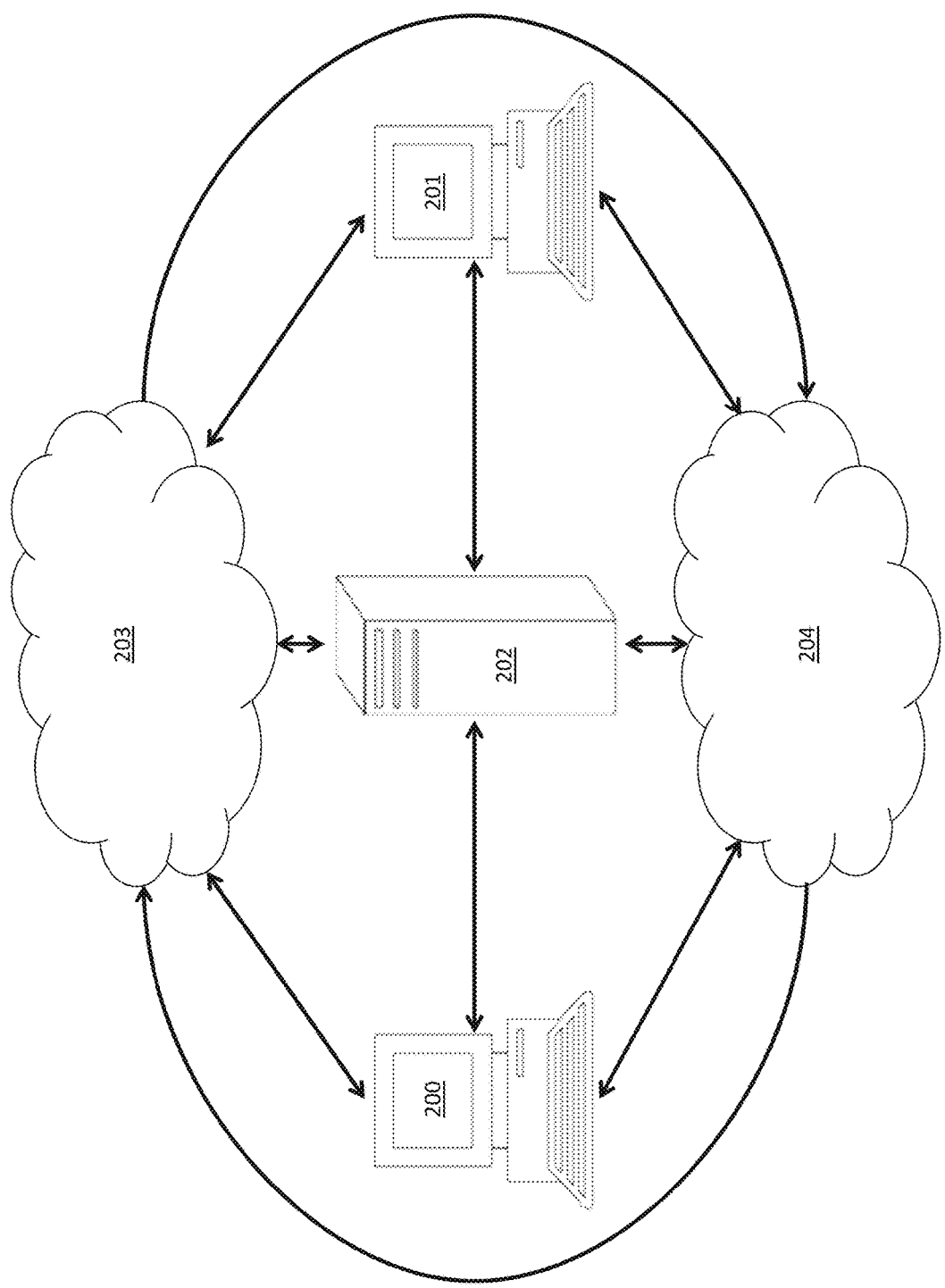
FIG. 2 depicts a system architecture for a distributed file system in a multi-cloud environment consistent with an embodiment of the present disclosure

Turning now to FIG. 2, a system for providing a distributed file system in a multi-cloud environment is discussed. The multi-cloud environment may be similar to the system discussed with reference to FIG. 1, and in an embodiment may include clients 200, 201, metadata server 202, and object stores 203, 204. Clients 200, 201 may be substantially similar to client 100 discussed in FIG. 1. MDS 202 may be similar to MDS 102 discussed in reference to FIG. 1. Finally, object stores 203, 204 may be similar to object store 104 discussed in reference to FIG. 1.

In some embodiments, when a client submits a read/write request to MDS 202 it may include an identifier or location for a preferred object store. For example, a client may prefer object store 203 to object store 204 for performance reasons. The MDS may take these preferences into consideration when building the URLs discussed above and returning them to the client. For example, the MDS may attempt to accommodate the client's request for a specific object store and include that object store's domain in <object store domain>.

The system of FIG. 2 may comprise multiple types of object stores in a multi-cloud environment. One object store may be the authoritative object store. An authoritative object store may be the primary object store for the system, and may have high availability. This may be the default object store clients attempt to access or that a MDS returns as the <object store domain>. The system may also include one or more secondary object stores. Secondary object stores may be a client's preferred object store, as mentioned above and discussed in co-pending U.S. patent application Ser. No. 14/671,740, hereby incorporated by reference, but may not be the authoritative object store (authoritative object stores may also be the preferred object store). The distributed file system may also include one or more transient object stores. Transient object stores may reside physically near the client, and in some embodiments are a site cache. For a discussion of transient object stores, please see co-pending U.S. patent application Ser. No. 14/673,071, hereby incorporated by reference for all purposes.

A MDS, such as MDS 202, may maintain an object store state for each object store in a multi-object store environment. These states may include READ_WRITE, READ_ONLY, INACTIVE, and UNREACHABLE. The READ_WRITE state may indicate the associated object store may be read from or written to. This may be the default state for an object store in the system, and authoritative object stores may always be in this state. The READ_ONLY state may indicate the object store may be read from, but cannot process write requests. This could be used, for example, if the object store has reached a storage capacity. An INACTIVE state may indicate the object store is not currently active, as discussed in more detail below. Finally, the UNREACHABLE state may indicate the associated object store is not available or inaccessible.

Figure 3:
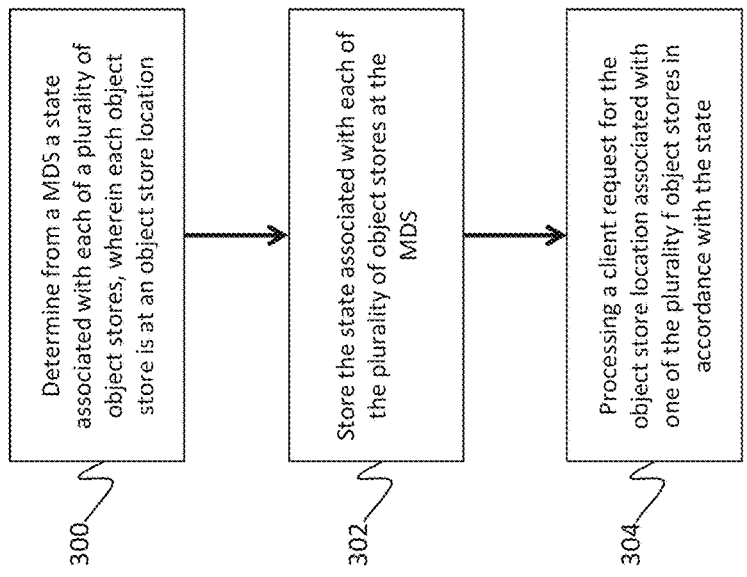
FIG. 3 depicts a process for storing the state of an object store consistent with an embodiment of the present disclosure

Turning now to FIG. 3, a process for maintaining a distributed file system with multiple object stores is discussed. At block 300, a state associated with each of a plurality of object stores is determined. For example, an authoritative object store may be marked as READ_WRITE automatically. Secondary and transient object stores, however, may have varying states, including those discussed above. Sending a request, such as a read request, from the MDS to the object stores and observing the response may determine their states. This process is discussed in further detail below. In an embodiment, this state determination is made when the MDS is first booted up or brought online. Additionally or alternatively, it may be performed when a client requests one or more object store locations.

At block 302, the state of each of the object stores may be stored at the MDS. This state could be stored, for example, in a database table. Additionally or alternatively, the state may be stored in a computer memory at the MDS.

Finally, at block 304, a client's request may be processed in accordance to one or more of the states. For example, if the client wishes to read from or write to an object store location with a READ_WRITE state, the appropriate URL may be returned to the client. Similarly, if the client wishes to read from a READ_ONLY object store, a suitable URL may be returned. Should the client request to write to a READ_ONLY object store, however, the MDS may return an error and/or the location of a READ_WRITE object store, such as the authoritative object store. Clients attempting to access an UNREACHABLE object store for either a read or a write operation may receive a similar error and/or alternative location.

Figure 4:
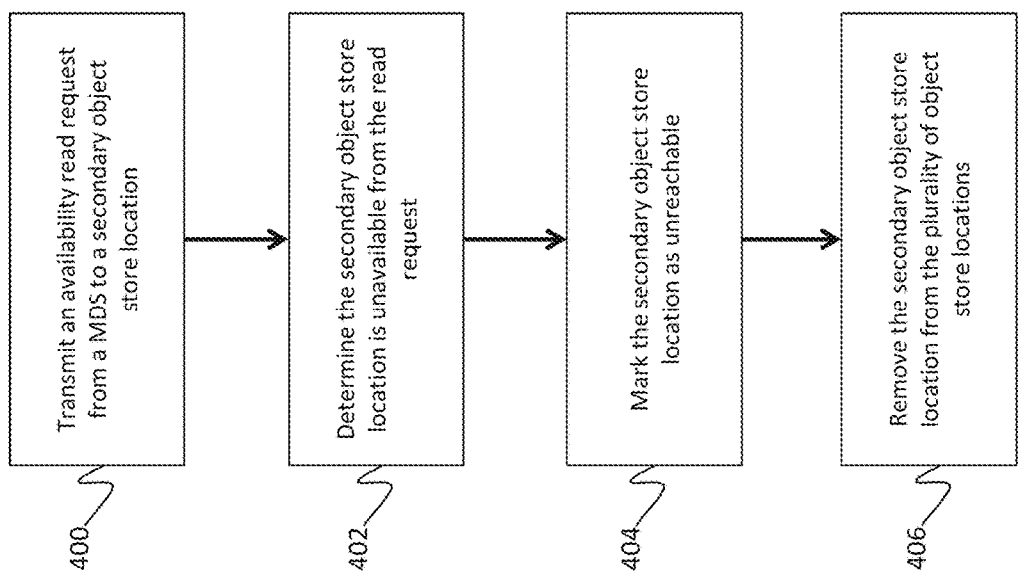
FIG. 4 depicts a process for determining the state of a secondary object store consistent with an embodiment of the present disclosure

Turning now to FIG. 4, secondary object stores are discussed. Secondary object stores may be similar to authoritative object stores. For example, the secondary object store may be any of the public and/or private object stores discussed above. Unlike authoritative object stores, however, secondary object stores may or may not always be available. For example, the authoritative object store may be a public object store, such as Amazon S3, with high availability. The secondary object store, in contrast, may be a local or hybrid cloud managed by an enterprise's IT department. This local or hybrid cloud may have a lesser availability than the public object store as the IT department has many other systems to manage. A client may prefer to access the secondary object store, however, if it is local and can provide superior read/write performance to the public object store.

Secondary object stores may have either a READ_WRITE or UNREACHABLE state. When UNREACHABLE, clients may not be able to read from or write to the secondary object store, and the MDS may reject such client requests or direct them to a different object store that is not UNREACHABLE. FIG. 4 depicts a process for determining whether the secondary object store is UNREACHABLE. This check may be performed when the MDS comes online, in response to a client making a read and/or write request, and/or it may be performed periodically as an automated or manual maintenance process.

At block 400, a read request may be transmitted from the MDS to the secondary object store location. This read request could be, for example, a HTTP GET or HEAD request. Additionally or alternatively, the MDS may determine the state of the secondary object store by issuing a write request, such as an HTTP PUT or POST.

At block 402, the MDS may determine the secondary object store is unavailable from the read request. For example, the MDS may not receive a response to the request, indicating the server is offline. Additionally or alternatively, the MDS may receive a 404 or other error indicating the server is available, but otherwise unable to satisfy the request. This could indicate the secondary object store is having issues and should not be trusted with read and/or write requests.

At 404, the MDS may mark the secondary object store location as UNREACHABLE. For example, the MDS may maintain a database table and/or bitmap of all the object store locations in the system. If an object store is UNREACHABLE, the MDS may include an entry or flip a bit indicating the location is not reachable. In some embodiments, the MDS may periodically poll UNREACHABLE object stores to see if they are available. When an UNREACHABLE secondary object store comes back online, the MDS may change that object store's state, such as to READ_WRITE, and process client requests accordingly.

Figure 5:
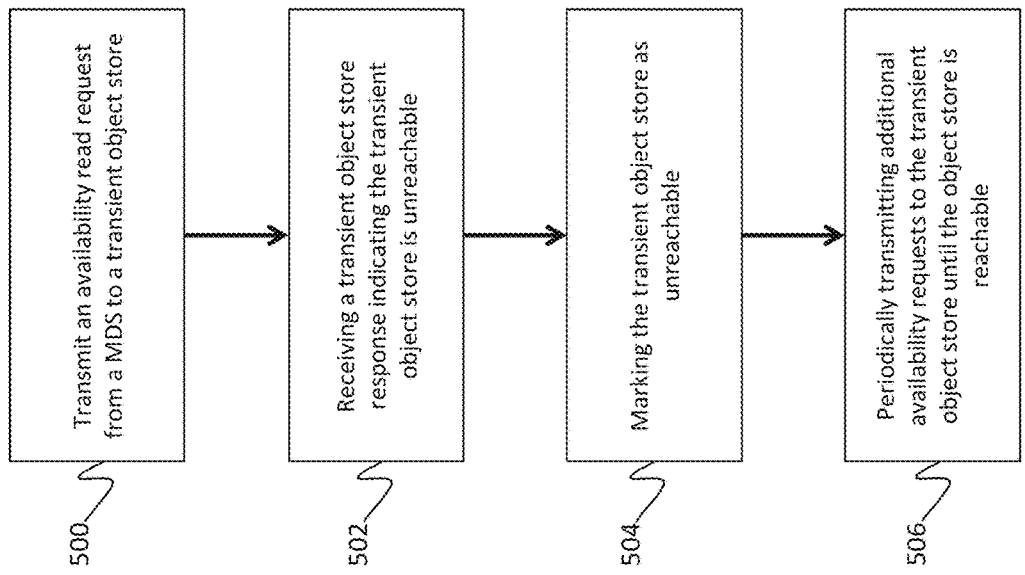
FIG. 5 depicts a process for determining the state of a transient object store consistent with an embodiment of the present disclosure.
Figure 6:
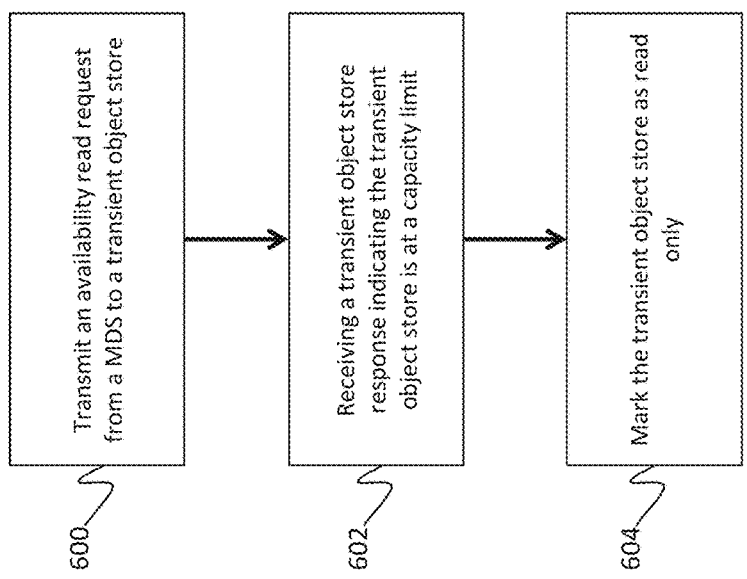
FIG. 6 depicts a process for determining a transient object store is at capacity consistent with an embodiment of the present disclosure.

Turning now to FIG. 5 and FIG. 6, a processes for determining the state of a transient object store is discussed. Transient object stores may temporarily store data objects. They could be, for example, a site cache physically located near the client. The client may prefer to write to and read from the transient object store given its proximity, but the transient object store may have limited capacity. Additionally, the transient object store may periodically be flushed to either an authoritative object store and/or a secondary object store. In some embodiments, a MDS may initially mark transient object stores as INACTIVE, indicating the state of that store is unknown.

FIG. 5 depicts a process for determining whether a transient object store is UNREACHABLE. This process may be substantially similar to determining whether the secondary object store is UNREACHABLE discussed above.

At block 500, an availability request may be transmitted from the MDS to the transient object store. This availability request could be, for example, an HTTP GET or HEAD request. Additionally or alternatively, the request could be a write request, such as an HTTP PUT or POST.

At 502, the MDS may receive a response indicating the transient object store is UNREACHABLE. This response could be, for example, a 404 or other error indicating the object store is not available to process client requests. This may be similar to block 402 discussed above.

At 504, the transient object store may be marked as unreachable. For example, a database entry associated with the transient object store may be updated to reflect this state.

Finally, at 506, the MDS may periodically transmit additional availability requests to the transient object store until it becomes available. In an embodiment, these requests may be transmitted at a regular scheduled basis. Additionally or alternatively, they may be sent when a future client requests to access the transient object store.

Turning now to FIG. 6, a process for determining the write status of a transient object store is discussed. Transient object stores may operate as a cache, and therefore may have a limited storage capacity. When the cache is full, it may not be able to service write requests until the cache is flushed. The state of a full cache may be marked as READ_ONLY, indicating the transient object store is available to service read requests but not write requests.

At block 600, a MDS may transmit an availability read request to a transient object store. This read request might be substantially similar to that discussed in reference to FIG. 4 and FIG. 5. Additionally or alternatively, the MDS may attempt to write an object to the transient object store.

At block 602, the MDS may receive a response from the transient object store indicating that it has reached a capacity limit. This could occur, for example, if the transient object store is being used as a cache and has exhausted its available storage resources. Those resources may become available when the transient object store is flushed, but the object store is currently at capacity.

At block 604, the transient object store is marked as being in a READ_ONLY state. The object store is available to service read requests from clients, but can not service write requests because it has reached its capacity limit. In some embodiments, the transient object store may notify the MDS when it flushes its cache, at which point the MDS may change the transient object store's state to READ_WRITE.

In some embodiments, transient object stores include a special service called a site cache service. The site cache service may be a software service that monitors the health of the transient object store. This service could, for example, report the state of the transient object store to the MDS. In such an embodiment, the MDS may not need to transmit state requests to the transient object store. For example, when a cache is at capacity the site cache service may transmit a notice to the MDS indicating the transient object store should be marked as READ_ONLY. When the cache is flushed, the site cache service may transmit a notice indicating the state should be marked as READ_WRITE. Similarly, when the transient object store is brought online the site cache service may transmit a notice indicating an UNREACHABLE or INACTIVE state should be replaced with READ_WRITE or READ_ONLY. Other configurations may exist.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method comprising:
receiving from a client, at a metadata server, a mount request to mount a distributed file system at the client, and the distributed file system enables client access to one or more object stores that are configured for communication with the metadata server and that each store one or more objects;
after the distributed file system has been mounted at the client, receiving from the client, at the metadata server, a request;
in response to receipt of the request from the client, consulting, by the metadata server, a metadata table to determine data objects located at a root of the mounted distributed file system;
transmitting, from the metadata server to the client, information related to the data objects and the information comprises a list of files and/or directories located at the root of the mounted distributed file system; and
maintaining, by the metadata server, the distributed file system so that the distributed file system is responsive to read and write requests by the client for the data objects associated with the files and/or directories, wherein maintaining the distributed file system includes performing operations comprising:
monitoring, and determining, by the metadata server, a respective state associated with each of the plurality of object stores of the distributed file system, wherein each object store is at an object store location, and the plurality of object stores comprises an authoritative object store that is a cloud-based object store, a secondary object store that is a cloud-based object store, and a transient object store that is located physically proximate to the client, and a state of one of the object stores is variable, and determination of the states of the object stores is made when the metadata server is first booted up or brought online;
automatically marking a state of the authoritative object store as READ_WRITE;
storing, by the metadata server, the respective state associated with each of the plurality of object stores;
receiving, at the metadata server, a client request that is either a read request or a write request, and the client request identifies an object store that is preferred by the client to service the client request, wherein the preference for that object store is based on a read/write performance characteristic of that object store; and
processing, by the metadata server, the client request based on the state of the preferred object store, and when the preferred object store is in a state that enables the preferred object store to service the client request, processing the client request comprises transmitting a uniform resource locator to the client that enables the client to access data identified in the client request, and when the preferred object store is not in a state that enables the preferred object store to service the client request, processing the client request comprises either rejecting the client request or redirecting the client request to another object store of the plurality of object stores.

2. The method of claim 1, wherein the authoritative object store has a relatively higher availability for read and/or write operations than either of the secondary object store or the transient object store.

3. The method of claim 1, further comprising transmitting an availability read request from the metadata server to a secondary object store location of the secondary object store.

4. The method of claim 3, further comprising determining the secondary object store location is unreachable from the read request.

5. The method of claim 4, further comprising marking the state of the secondary object store location as unreachable.

6. The method of claim 1, wherein the read/write performance characteristic comprises one or both of a client connection latency and a client connection bandwidth.

7. The method of claim 1, further comprising transmitting an availability request from the metadata server to the transient object store location.

8. The method of claim 7, further comprising:
receiving a transient object store response indicating the transient object store is at a capacity limit; and
marking the state of the transient object store as read only.

9. The method of claim 7, further comprising:
determining the transient object store is unreachable from the availability request; and
marking the state of the transient object store as unreachable.

10. The method of claim 9, further comprising:
periodically transmitting additional availability requests to the transient object store until the transient object store is reachable; and
marking the state of the transient object store as either one of read only or read/write.

11. A non-transitory computer readable storage medium comprising processor instructions, and the processor instructions are executable to perform operations comprising:
receiving from a client, at a metadata server, a mount request to mount a distributed file system at the client, and the distributed file system enables client access to one or more object stores that are configured for communication with the metadata server and that each store one or more objects;
after the distributed file system has been mounted at the client, receiving from the client, at the metadata server, a request;
in response to receipt of the request from the client, consulting, by the metadata server, a metadata table to determine data objects located at a root of the mounted distributed file system;
transmitting, from the metadata server to the client, information related to the data objects and the information comprises a list of files and/or directories located at the root of the mounted distributed file system; and
maintaining, by the metadata server, the distributed file system so that the distributed file system is responsive to read and write requests by the client for the data objects associated with the files and/or directories, wherein maintaining the distributed file system includes performing operations comprising:
monitoring, and determining, by the metadata server, a respective state associated with each of the plurality of object stores of the distributed file system, wherein each object store is at an object store location, and the plurality of object stores comprises an authoritative object store that is a cloud-based object store, a secondary object store that is a cloud-based object store, and a transient object store that is located physically proximate to the client, and a state of one of the object stores is variable, and determination of the states of the object stores is made when the metadata server is first booted up or brought online;

automatically marking a state of the authoritative object store as READ_WRITE;

storing, by the metadata server, the respective state associated with each of the plurality of object stores;

receiving, at the metadata server, a client request that is either a read request or a write request, and the client request identifies an object store that is preferred by the client to service the client request, wherein the preference for that object store is based on a read/write performance characteristic of that object store; and processing, by the metadata server, the client request based on the state of the preferred object store, and when the preferred object store is in a state that enables the preferred object store to service the client request, processing the client request comprises transmitting a uniform resource locator to the client that enables the client to access data identified in the client request, and when the preferred object store is not in a state that enables the preferred object store to service the client request, processing the client request comprises either rejecting the client request or redirecting the client request to another object store of the plurality of object stores.

12. The instructions of claim 11, wherein the authoritative object store has a relatively higher availability for read and/or write operations than either of the secondary object store or the transient object store.

13. The instructions of claim 11, further comprising transmitting an availability read request from the metadata server to a secondary object store location of the secondary object store.

14. The instructions of claim 13, further comprising determining the secondary object store location is unreachable from the read request.

15. The instructions of claim 14, further comprising marking the state of the secondary object store location as unreachable.

16. The instructions of claim 11, wherein the read/write performance characteristic comprises one or both of a client connection latency and a client connection bandwidth.

17. The instructions of claim 11, further comprising transmitting an availability request from the metadata server to the transient object store location.

18. The instructions of claim 17, further comprising:
receiving a transient object store response indicating the transient object store is at a capacity limit; and
marking the state of the transient object store as read only.

19. The instructions of claim 17, further comprising:
determining the transient object store is unreachable from the availability request; and
marking the state of the transient object store as unreachable.

20. A system comprising:
a non-transitory computer readable medium and processor, and the non-transitory computer readable medium comprising processor instructions executable by the processor to perform operations comprising:
receiving from a client, at a metadata server, a mount request to mount a distributed file system at the client, and the distributed file system enables client access to one or more object stores that are configured for communication with the metadata server and that each store one or more objects;
after the distributed file system has been mounted at the client, receiving from the client, at the metadata server, a request;
in response to receipt of the request from the client, consulting, by the metadata server, a metadata table to determine data objects located at a root of the mounted distributed file system;
transmitting, from the metadata server to the client, information related to the data objects and the information comprises a list of files and/or directories located at the root of the mounted distributed file system; and
maintaining, by the metadata server, the distributed file system so that the distributed file system is responsive to read and write requests by the client for the data objects associated with the files and/or directories, wherein maintaining the distributed file system includes performing operations comprising:
monitoring, and determining, by the metadata server, a respective state associated with each of the plurality of object stores of the distributed file system, wherein each object store is at an object store location, and the plurality of object stores comprises an authoritative object store that is a cloud-based object store, a secondary object store that is a cloud-based object store, and a transient object store that is located physically proximate to the client, and a state of one of the object stores is variable, and determination of the states of the object stores is made when the metadata server is first booted up or brought online;
automatically marking a state of the authoritative object store as READ_WRITE;
storing, by the metadata server, the respective state associated with each of the plurality of object stores;
receiving, at the metadata server, a client request that is either a read request or a write request, and the client request identifies an object store that is preferred by the client to service the client request, wherein the preference for that object store is based on a read/write performance characteristic of that object store; and
processing, by the metadata server, the client request based on the state of the preferred object store, and when the preferred object store is in a state that enables the preferred object store to service the client request, processing the client request comprises transmitting a uniform resource locator to the client that enables the client to access data identified in the client request, and when the preferred object store is not in a state that enables the preferred object store to service the client request, processing the client request comprises either rejecting the client request or redirecting the client request to another object store of the plurality of object stores.

* * * * *